US008288986B2

(12) United States Patent
Flack

(10) Patent No.: US 8,288,986 B2
(45) Date of Patent: Oct. 16, 2012

(54) CONCENTRIC CONNECTOR FOR ELECTRIC VEHICLES

(75) Inventor: Albert J. Flack, Garden Grove, CA (US)

(73) Assignee: AeroVironment Inc., Monrovia, CA (US)

( * ) Notice: Subject to any disclaimer, the term of this patent is extended or adjusted under 35 U.S.C. 154(b) by 602 days.

(21) Appl. No.: 12/387,092

(22) Filed: Apr. 27, 2009

(65) Prior Publication Data
US 2009/0273310 A1    Nov. 5, 2009

Related U.S. Application Data

(60) Provisional application No. 61/125,569, filed on Apr. 28, 2008.

(51) Int. Cl.
*H02J 7/14* (2006.01)
(52) U.S. Cl. .................. 320/104; 439/843; 385/101
(58) Field of Classification Search .................. None
See application file for complete search history.

(56) References Cited

U.S. PATENT DOCUMENTS

| | | | |
|---|---|---|---|
| 970,490 A | 11/1907 | Burbank | |
| 1,247,660 A | 11/1917 | Garrison | |
| 2,540,012 A | 1/1951 | Salati | |
| 3,193,636 A | 7/1965 | Daniels | |
| 3,585,564 A | 6/1971 | Skjervoll | |
| 3,808,577 A | 4/1974 | Mathauser | |
| 3,831,133 A | 8/1974 | Grundfest | |
| 4,165,911 A | 8/1979 | Laudig | |
| 4,199,653 A * | 4/1980 | Talley | 174/15.7 |
| 4,593,464 A | 6/1986 | Williams et al. | |
| 4,681,385 A | 7/1987 | Kruger et al. | |
| 4,773,866 A | 9/1988 | Basques | |
| 4,896,939 A | 1/1990 | O'Brien | |
| 5,079,562 A | 1/1992 | Yarsunas et al. | |
| 5,137,469 A * | 8/1992 | Carpenter et al. | 439/578 |
| 5,157,319 A | 10/1992 | Klontz et al. | |
| 5,306,999 A | 4/1994 | Hoffman | |
| 5,327,065 A | 7/1994 | Bruni et al. | |
| 5,341,083 A | 8/1994 | Klontz et al. | |

(Continued)

FOREIGN PATENT DOCUMENTS
CH    520 418 A    3/1972

OTHER PUBLICATIONS

"International Search Report and Written Opinion of the International Searching Authority" Jun. 26, 2009, for corresponding PCT Application No. PCT/US09/02622.

(Continued)

*Primary Examiner* — Roberto Velez
*Assistant Examiner* — Temilade S Rhodes-Vivour
(74) *Attorney, Agent, or Firm* — Eric J. Aagaard, Esq.; The Law Office of John A. Griecci

(57) ABSTRACT

An electrical connection system including a triaxial socket and a triaxial plug, each having three concentric contacts—an inner, an intermediate and an outer contact. In the process of connecting, the outer contacts connect first, the inner contacts connect second, and the intermediate contacts connect third. All contacts except the plug inner contact are connected to an insulator that covers one radial side of the contact, and extends past and over the end of the contact. Two of the insulators isolate the inner contacts from the intermediate contacts prior to either of their connections being made.

4 Claims, 8 Drawing Sheets

U.S. PATENT DOCUMENTS

| | | |
|---|---|---|
| 5,478,250 A | 12/1995 | Hoffman |
| 5,563,491 A | 10/1996 | Tseng |
| 5,574,815 A | 11/1996 | Kneeland |
| 5,596,258 A | 1/1997 | Kimura et al. |
| 5,759,069 A | 6/1998 | Kitatani et al. |
| 5,909,099 A | 6/1999 | Watanabe et al. |
| 5,909,100 A | 6/1999 | Watanabe et al. |
| 5,929,599 A | 7/1999 | Watanabe et al. |
| 6,175,212 B1 | 1/2001 | Oguri |
| 6,310,465 B2 | 10/2001 | Najima |
| 6,320,352 B2 | 11/2001 | Terazoe |
| 6,471,530 B1 | 10/2002 | Gimbatti et al. |
| 6,988,915 B2 | 1/2006 | Hirose |
| 7,311,566 B2 | 12/2007 | Dent |
| 7,394,667 B2 | 7/2008 | Kelly et al. |
| 7,726,396 B2 * | 6/2010 | Briquet et al. ............ 166/242.6 |
| 2003/0120442 A1 | 6/2003 | Pellegrino et al. |

OTHER PUBLICATIONS

Communication, including a "Supplementary European Search Report and Search Opinion" for corresponding European Application No. EP 09739182.5, dated Sep. 6, 2011, from the European Patent Office, The Hague, Netherlands.

* cited by examiner

CONCENTRIC CONNECTOR FOR ELECTRIC VEHICLES

This application claims the benefit of U.S. provisional Application No. 61/125,569, filed Apr. 28, 2008, which is incorporated herein by reference for all purposes.

The present invention relates generally to electrical connection systems and, more particularly, to a triaxial concentric connection system for charging electric vehicles.

BACKGROUND OF THE INVENTION

As the market for electric vehicles evolves, it becomes necessary to have safe and convenient charging systems for "refueling" these vehicles. In order to ease the transition from traditional gasoline vehicle refueling, it is preferable if the electric vehicle refueling experience is similar to that for gasoline powered vehicles. Thus, similar to gasoline refueling pumps, present day charging systems are typically designed as charging stations having a base unit for managing the fuel supply (i.e., electricity), a fuel transfer hose (i.e., a transmission cable that safely carries the electricity to the car), and a connector that can pass the electricity to the vehicle with a minimum of work by the user or risk to the user.

There are a wide variety of electric vehicle charging requirements, but it is advantageous to standardize the charging station design so that a single charging station can meet the requirements of any vehicle. Thus, the hose and connector should be able to pass large amounts of energy without exposing the user to a significant risk of being shocked.

Accordingly, there has existed a need for an easily usable refueling station that is safe and efficient. Preferred embodiments of the present invention satisfy these and other needs, and provide further related advantages.

SUMMARY OF THE INVENTION

In various embodiments, the present invention solves some or all of the needs mentioned above, providing a connection system for an electric vehicle charging station, a related charging station, and a vehicle equipped for use with the charging station.

Under the invention, an electrical connection system includes a plug and a socket. The socket extends longitudinally from a proximal socket end to a distal socket end. The socket includes an inner socket-protrusion defining a longitudinally extending inner socket-aperture, an intermediate socket-protrusion concentrically extending around the inner socket-protrusion to form an intermediate socket-aperture therebetween, and an outer socket-protrusion concentrically extending around the intermediate socket-protrusion to form an outer socket-aperture therebetween. Each socket-aperture has an open distal end and an inward-facing electrical conductor that extends to a respective conductor-distance from the proximal end of the socket. Likewise, the plug extends longitudinally from a proximal plug end to a distal plug end. The plug includes an inner plug-protrusion, an intermediate plug-protrusion concentrically extending around the inner plug-protrusion, and an outer plug-protrusion concentrically extending around the intermediate plug-protrusion. Each plug-protrusion is configured with an outward-facing electrical conductor that extends a respective conductor-distance from the proximal end of the plug, and is configured to be conformingly received within the respective socket-aperture by the inward-facing conductor of the respective socket-protrusion.

The sum of the conductor-distances of the outer plug-protrusion and the outer socket-protrusion is larger than either the sum of the conductor-distances of the inner plug-protrusion and the inner socket-protrusion or the sum of the conductor-distances of the intermediate plug-protrusion and the intermediate socket-protrusion. Additionally, the sum of the conductor-distances of the inner plug-protrusion and the inner socket-protrusion is larger than the sum of the conductor-distances of the intermediate plug-protrusion and the intermediate socket-protrusion. Advantageously, these features provide for the outer protrusion to be used both as a physical shield and as a ground, protecting a user from accidental exposure to the charged inner and intermediate conductors as they each, consecutively connect.

Each socket-protrusion has an outward-facing electrical insulator that extends to an insulator-distance from the proximal end of the socket that is larger than the respective conductor-distance of that socket-protrusion. This provides for the socket, which may be connected to a power source, to minimize the external exposure of its conductors, and thereby reduce the risk that a user could accidentally come into contact with a live conductor.

The intermediate plug-protrusion has an inward-facing electrical insulator that extends to an insulator-distance from the proximal end of the plug. The sum of the insulator-distances of the inner socket-protrusion and the intermediate plug protrusion is larger than the sum of the conductor-distances of the inner plug-protrusion and the inner socket-protrusion. This provides for these two insulators to isolate the inner conductor pair from the intermediate conductor pair prior to either of the conductor pairs electrically connecting.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Socket

Figure 1:
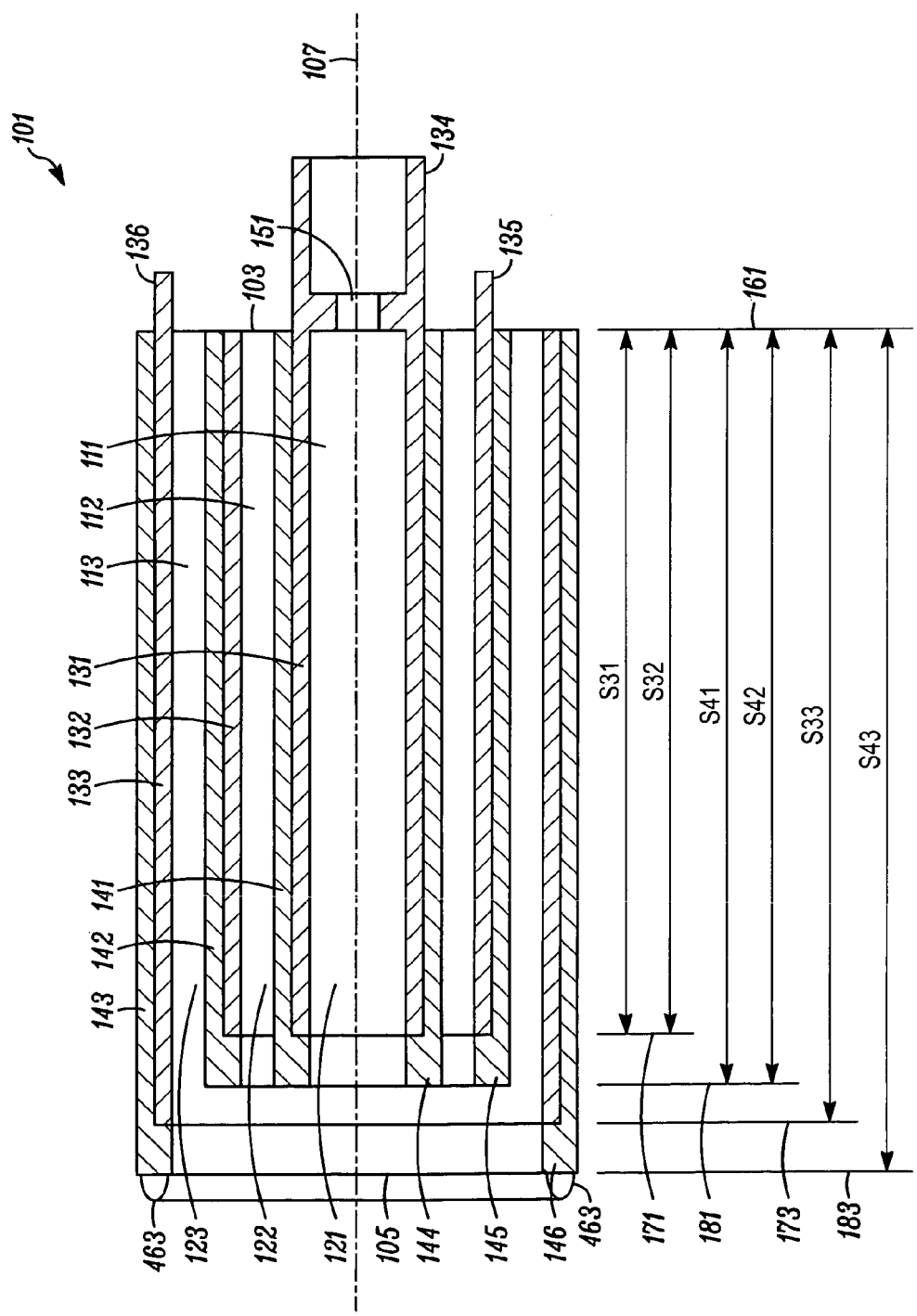
FIG. 1 is a front cross-section view of a socket embodying the present invention.

With reference to FIG. 1, a first embodiment of the present invention resides in an electrical connection system that includes a socket 101 that extends longitudinally from a proximal end 103 to a distal end 105 along an insertion axis 107. The socket includes three socket-protrusions, each having an annular shape with a cylindrical outer face and a hyperboloid inner face. These socket-protrusions include a first, inner socket-protrusion 111 defining an approximately cylindrical, first, inner socket-aperture 121. They further include a second, intermediate socket-protrusion 112 concentrically extending around the inner socket-protrusion 111 to define an annular, second, intermediate socket-aperture 122 therebetween. They additionally include a third, outer socket-protrusion 113 concentrically extending around the intermediate socket-protrusion 112 to define an annular, outer, outer socket-aperture 123 therebetween.

Each socket-aperture 121, 122, 123 extends longitudinally along (i.e., concentrically surrounding) the insertion axis 107 from a closed proximal end at or near the proximal end 103 of the socket to an open distal end at or facing the distal end 105 of the socket. In the present embodiment, the proximal end of each socket-aperture is in a single longitudinal location 161 along the insertion axis, but in other embodiments they may be in varied locations.

Each socket-protrusion is provided with an electrically isolated, concentric, inward-facing electrical conductor, and also with a concentric, outward-facing electrical insulator. More particularly, the inner socket-protrusion 111 is provided with a first, inner socket-conductor 131 and a first, inner socket-insulator 141. Likewise, the intermediate socket-protrusion 112 is provided with a second, intermediate socket-conductor 132 and a second, intermediate socket-insulator 142, and the outer socket-protrusion 113 is provided with a third, outer socket-conductor 133 and a third, outer socket-insulator 143.

The socket-conductors are typically of an in-line hyperboloid radial socket configuration characterized by an array of contacting elements that are hyperbolically arrayed around an inner diameter of the conductor and skewed with respect to the longitudinal direction, as is known in the art for a female in-line electrical connector, to provide a repeatable, high-quality electrical connection. The socket-conductors may be RADSOK® High Amperage Electrical Terminals. Each socket-conductor (131, 132 and 133) is provided with a contact (134, 135 and 136, respectively) at or near its proximal end for electrically connecting the connector to the electrical system of a charging system, such as one configured to charge an electric vehicle. The three insulators may be structurally separate, or part of a unitary body.

Each socket-conductor distally extends to an individual socket conductor-distance from the proximal end 103 of the socket. Likewise, each socket-insulator distally extends to an individual insulator-distance from the proximal end 103 of the socket. It should be understood that the socket conductor-distances and insulator-distances are individual in that they can all be unique from one another, but are not necessarily so. It should be further understood that the socket-conductors and socket-insulators do not necessarily extend to the proximal end of the socket. Rather it should be understood that the proximal end of the socket is being used herein as a common reference location from which to measure the distal extent to which the socket-conductors both extend and are exposed for electrical contact by plug-conductors. It should also be understood that the proximal end of the socket is being used as a common reference location from which to measure the distal extent to which the socket-insulators extend and provide electrical insulation.

The inner socket-conductor 131, intermediate socket-conductor 132 and outer socket-conductor 133 each extend to a respective socket conductor-distance S31, S32 & S33 from the proximal end 103 of the socket. In this embodiment, S31 equals S32, and therefore the inner and intermediate socket-conductors extend distally to a single longitudinal end location 171, while S33 is greater than S31 and S32, and therefore the outer socket-conductor extends to a different longitudinal end location 173 that is distal to the longitudinal end location 171 of the inner and intermediate socket-conductors.

The inner socket-insulator 141, intermediate socket-insulator 142 and outer socket-insulator 143 each extend to a respective socket insulator-distance S41, S42 & S43 from the proximal end 103 of the socket 101. In this embodiment, S41 equals S42, and therefore the inner and intermediate socket-insulators extend distally to a single end location 181, while S43 is greater than S41 and S42, and therefore the outer socket-insulator extends distally to a different longitudinal end location 183 that is distal to the longitudinal end location 171 of the inner and intermediate socket-insulators.

For each socket-protrusion, the respective socket insulator-distance is greater than the socket conductor-distance (i.e., S41>S31, S42>S32, and S43>S33). Thus, each socket-insulator extends distally past its respective socket-conductor. Additionally, for each socket-protrusion (111, 112 and 113), a distal portion of the respective socket-insulator (141, 142 and 143) extends radially inward toward the insertion axis to form an end-cap (144, 145 and 146, respectively) that covers the distal end of the respective socket-conductor (131, 132 and 133). Such end-caps may reduce the likelihood that electrical arcing will occur prior to physical contact between an arriving, mated pair of plug- and socket-conductors, or after physical contact is broken between a departing, mated pair of plug- and socket-conductors.

Plug

Figure 2:
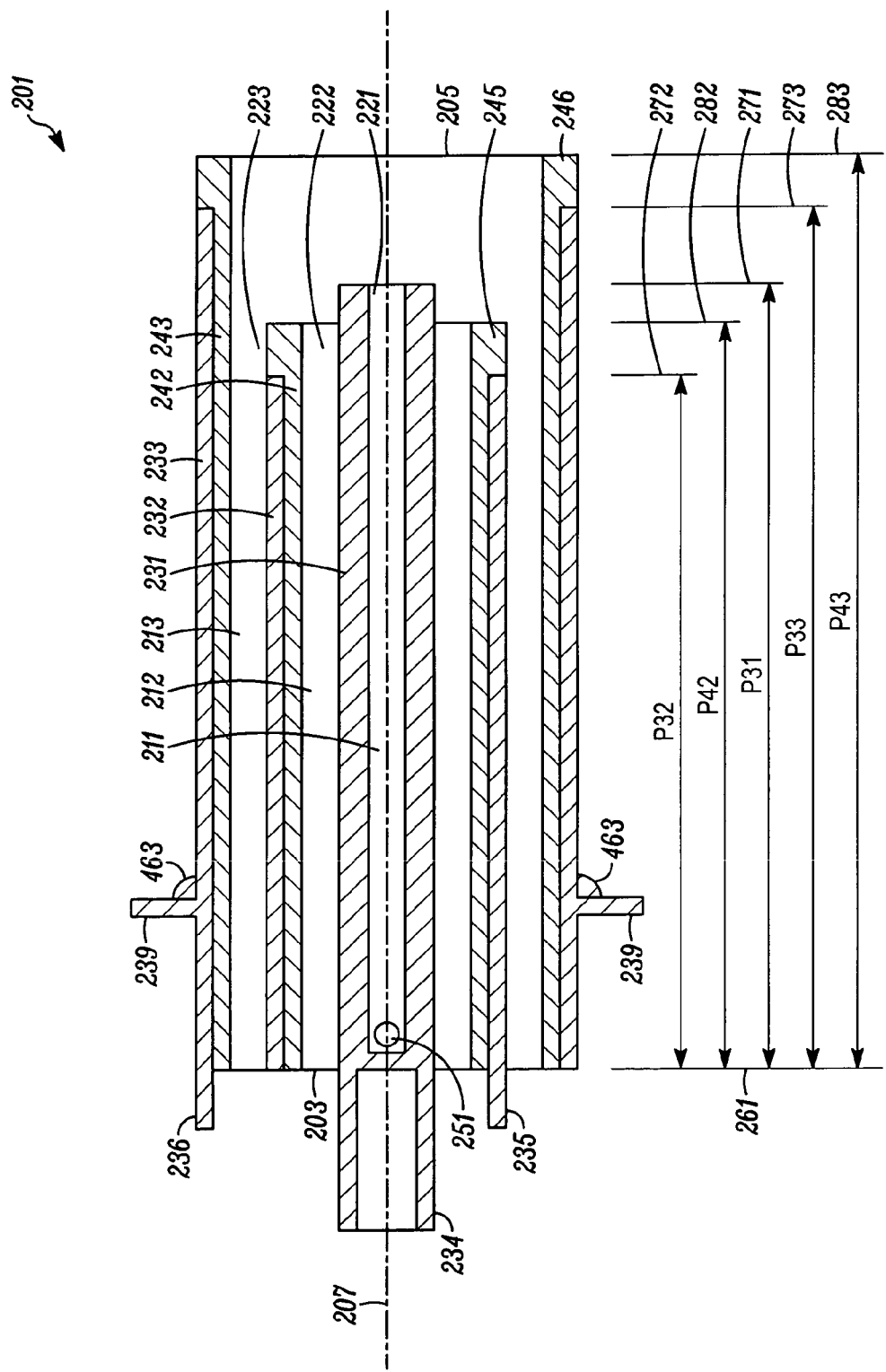
FIG. 2 is a front cross-section view of a plug embodying the present invention.

With reference to FIGS. 1 & 2, the connection system further includes a plug 201 that extends longitudinally from a proximal end 203 to a distal end 205 along an insertion axis 207. The plug includes three plug-protrusions, each having an annular shape with a cylindrical outer face and a cylindrical inner face, including a first, inner plug-protrusion 211 defining a cylindrical first, inner plug-aperture 221, a second, intermediate plug-protrusion 212 concentrically extending around the inner plug-protrusion 211 to define an annular second, intermediate plug-aperture 222 therebetween, and a third, outer plug-protrusion 213 concentrically extending around the intermediate plug-protrusion 212 to define an annular, third, outer plug-aperture 223 therebetween.

Each plug-aperture 221, 222, 223 extends longitudinally along (i.e., concentrically surrounding) the insertion axis 207 from a closed proximal end at or near the proximal end 203 of the plug to an open distal end at or facing the distal end 205 of the plug. In the present embodiment, the proximal end of each plug-aperture is in a single longitudinal location 261 along the insertion axis, but in other embodiments they may be in varied locations.

Each plug-protrusion is provided with an electrically isolated, concentric, outward-facing, cylindrical electrical conductor. The second and third plug-protrusions are each provided with a concentric, inward-facing electrical insulator. More particularly, the inner plug-protrusion 211 is provided with a first, inner plug-conductor 231, but lacks a plug-insulator. The intermediate plug-protrusion 212 is provided with a second, intermediate plug-conductor 232 and a second, intermediate plug-insulator 242. Likewise, the outer plug-protrusion 213 is provided with a third, outer plug-conductor 233 and a third, outer plug-insulator 243.

The plug-conductors will typically be of a cylindrical configuration, as is known in the art for mating with the in-line hyperboloid electrical connector discussed above, to provide a repeatable, high-quality electrical connection. Each plug-conductor (234, 235 and 236) includes a contact (234, 235 and 236, respectively) at or near its proximal end for electrically connecting the plug-conductor to the electrical system of a rechargeable device such as an electric vehicle. The two insulators may be structurally separate, or part of a unitary body.

Upon plugging the plug 201 into the socket 101, the first second and third plug-protrusions 211, 212 & 213 are conformingly received into the first, second and third socket-apertures 121, 122 & 123, respectively. At the same time, the first and second socket-protrusions 111 & 112 are conformingly received into the second and third plug-apertures 222 & 223, respectively, and the third socket-protrusion 113 is received over and surrounding the third plug-protrusion 213.

More particularly, each socket-conductor is configured to cooperatively receive its respective plug-conductor, i.e., the inner socket-conductor 131 is configured to cooperatively receive the inner plug-conductor 231, the intermediate socket-conductor 132 is configured to cooperatively receive the intermediate plug-conductor 232, and the outer socket-conductor 133 is configured to cooperatively receive the outer plug-conductor 233. With all three plug-conductors received by their respective socket-conductors, each respective pair of plug- and socket-conductors is in electrical communication with one another, and is electrically isolated from the other two respective pairs of plug- and socket-conductors.

Each plug-conductor distally extends to an individual plug conductor-distance from the proximal end 203 of the plug. Likewise, each plug-insulator distally extends to an individual plug insulator-distance from the proximal end 203 of the plug. It should be understood that the plug conductor-distances and insulator-distances are individual in that they can all be unique from one another, though they are not necessarily so. It should be further understood that the plug-conductors and plug-insulators do not necessarily extend to the proximal end of the plug. Rather, it should be understood that the proximal end of the plug is being used herein as a common reference location from which to measure the distal extent to which the plug-conductors both extend and are exposed for electrical contact by one of the socket-conductors. It should also be understood that the proximal end of the plug is being used as a common reference location from which to measure the distal extent to which the plug-insulators extend and provide electrical insulation.

The inner plug-conductor 231, intermediate plug-conductor 232 and outer plug-conductor 233 each extend to a respective plug conductor-distance, P31, P32 & P33, from the proximal end 203 of the plug 201. In this embodiment, P31 is greater than P32, and therefore the inner plug-conductor extends distally to a longitudinal end location 271 that is distal to a longitudinal end location 272 of the intermediate plug-conductor. Likewise, P33 is greater than P31, and therefore the outer plug-conductor extends distally to a longitudinal end location 273 that is distal to the longitudinal end locations 271 & 272 of the inner and intermediate plug-conductors.

The intermediate plug-insulator 242 and outer plug-insulator 243 each extend to a respective plug insulator-distance P42 and P43 from the proximal end 203 of the plug. In this embodiment, P43 is greater than P42, and therefore the outer plug-insulator extends distally to a longitudinal end location 283 that is distal to a longitudinal end location 282 of the intermediate plug-insulator.

For each of the intermediate and outer plug-protrusions, the insulator-distance is greater than the respective conductor-distance (i.e., P42>P32, and P43>P33). Thus, each plug-insulator extends distally past its respective plug-conductor. Additionally, for each intermediate and outer plug-protrusion (212 and 213), a distal portion of the respective plug-insulator (242 and 243) extends radially outward, away from the insertion axis, to form an end-cap (245 and 246, respectively) that covers the distal end of the respective plug-conductor (232 and 233). Such end-caps may reduce the likelihood that electrical arcing will occur prior to physical contact between an arriving, mated pair of plug- and socket-conductors, or after physical contact is broken between a departing, mated pair of plug- and socket-conductors. They may also reduce the risk of a user accidentally contacting a hot conductor.

Charging Station

Figure 3:
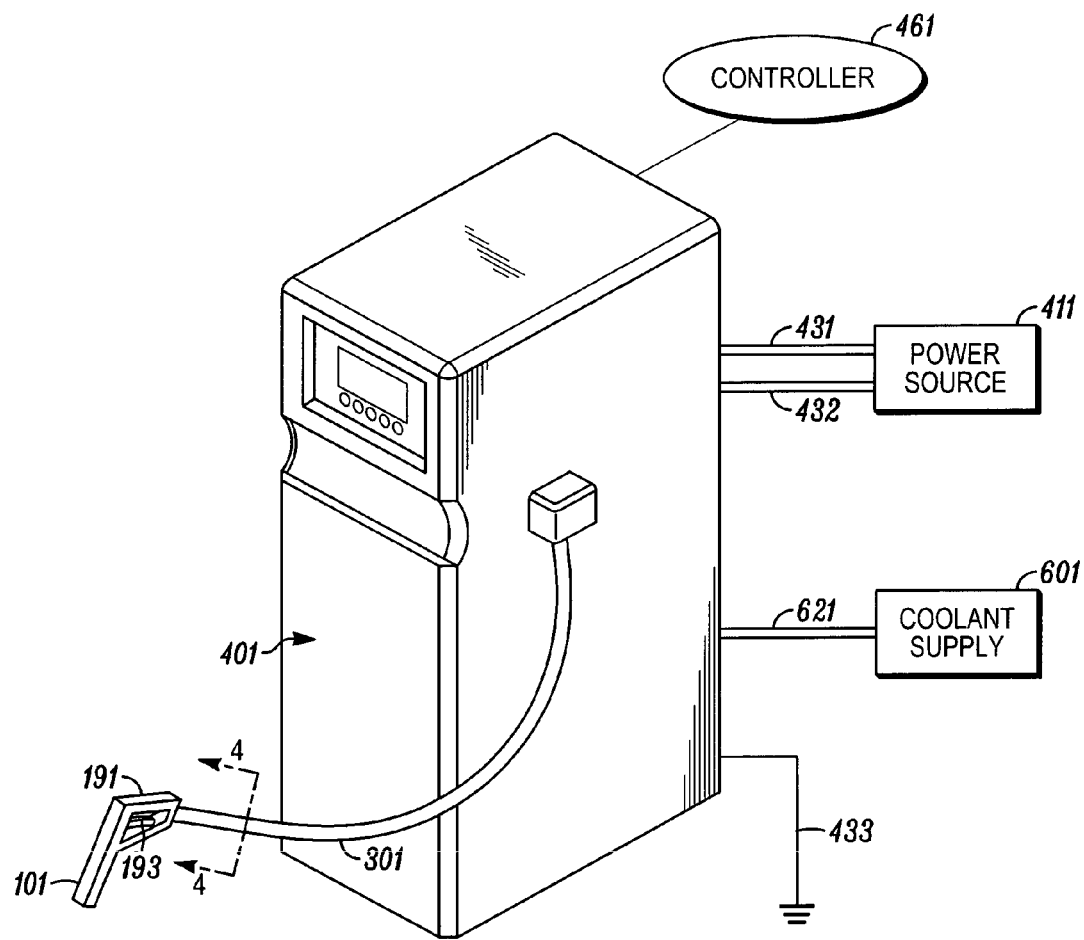
FIG. 3 is a perspective view of a charging station embodying the present invention, including the socket of FIG. 1.
Figure 4:
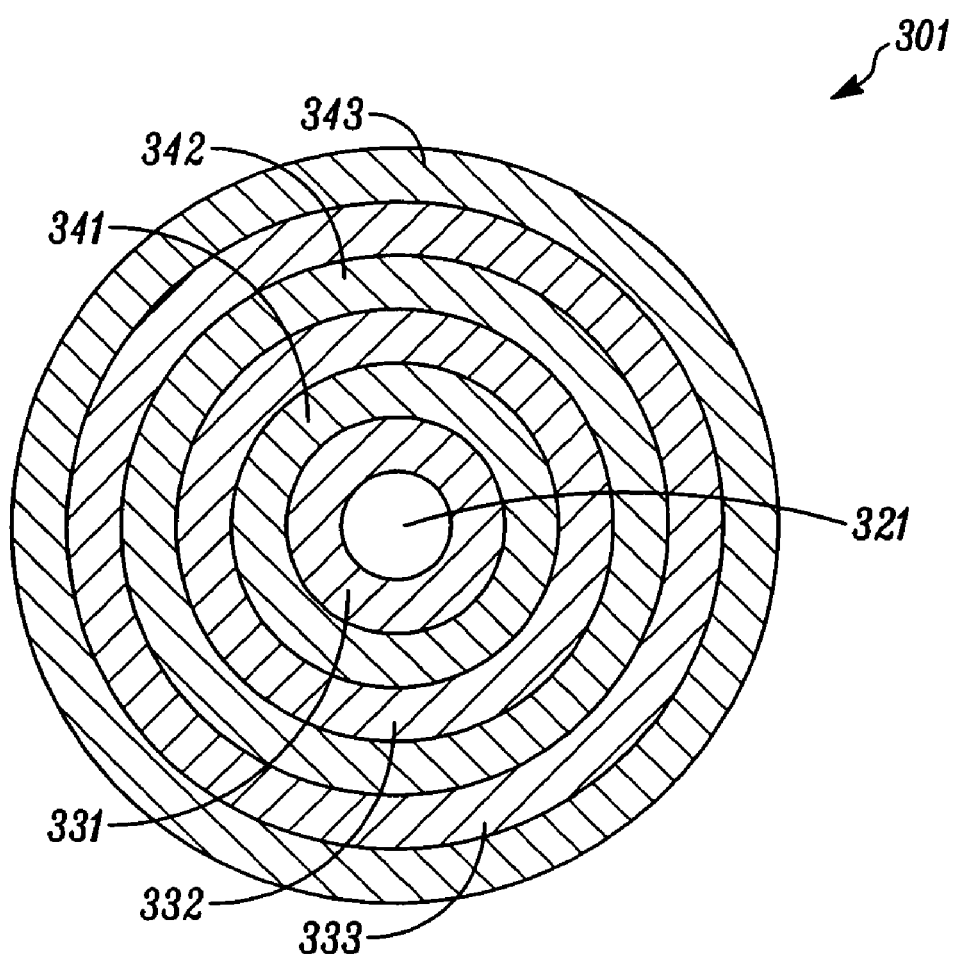
FIG. 4 is a cross-sectional view of a transmission cable as used in the charging station depicted in FIG. 3, taken along lines 4-4 of FIG. 3.

With reference to FIGS. 3 & 4, the embodiment further resides in a charging station for charging an electric vehicle. In addition to the socket 101 from the above-described electrical connection system, the charging station also includes a transmission cable 301 and a base station 401. The transmission cable is a triaxial cable that includes an inner cable-conductor 331, an intermediate cable-conductor 332 and an outer cable-conductor 333, each being surrounded by a cable-insulator, including an inner cable-insulator 341 surrounding the inner cable-conductor and surrounded by the intermediate cable-conductor, an intermediate cable-insulator 342 surrounding the intermediate cable-conductor and surrounded by the outer cable-conductor, and an outer cable-insulator 343 surrounding the outer cable-conductor. The charging station includes or is connected to a power source 411 having a first base-station-lead 431 and a second base-station-lead 432, along with an electrically separate base-station-ground 433.

The transmission cable 301 physically connects the base station 401 to the socket 101. Additionally, the inner cable-conductor 331 electrically connects the first base-station-lead 431 to the inner socket-conductor 131, the intermediate cable-conductor 332 electrically connects the second base-station-lead 432 to the intermediate socket-conductor 132, and the outer cable-conductor 333 electrically connects the base-station-ground 433 to the outer socket-conductor 133. Each cable-conductor connects (331, 332 and 333) to its respective socket-conductor (131, 132 and 133) via that socket-conductor's contact (134, 135, 136, respectively), as mentioned above.

The socket is provided with a handle 191 and a trigger 193, which approximate those used in filling gasoline-powered vehicles.

Electric Vehicle

Figure 5:
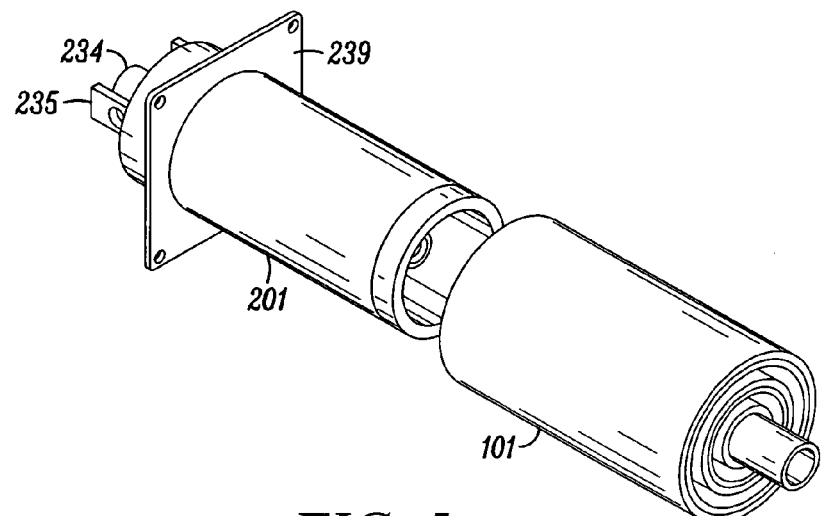
FIG. 5 is a perspective cross-sectional view of the plug and socket of FIGS. 1 and 2.
Figure 6:
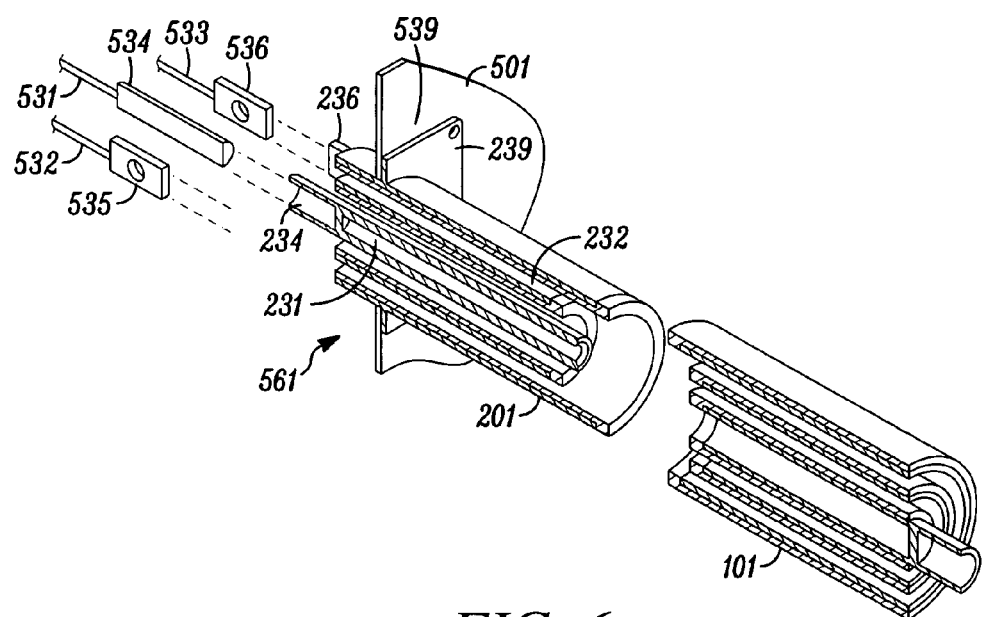
FIG. 6 is a perspective view of the plug and socket of FIG. 5.

With reference to FIGS. 5 and 6, the inner plug-conductor 231 electrically connects to a first electrical EV-conductor 531 of an electrical vehicle 501 via the inner plug-conductor's contact 234 and a first EV-contact 534. Likewise, the intermediate plug-conductor 232 electrically connects to a second electrical conductor 532 of the electrical vehicle via the intermediate plug-conductor's contact 235 and a second EV-contact 535. Furthermore, the outer plug-conductor 233 electrically connects to a third electrical EV-conductor 533 of the electrical vehicle via the intermediate plug-conductor's contact 236 and a third EV-contact 536.

The first and second EV-conductors electrically connect to the EV electrical system and batteries, while the third EV-conductor is grounded to the EV frame 539. When the plug 201 is received in the socket 101 and the inner and intermediate plug- and socket conductors connect, the EV charging system is electrically connected to the base-station first and second conductors 431 and 432, respectively, thereby electrically connecting the car battery system for charging by the base station. The third EV-conductor connects to the car ground to the charging station ground.

The outer plug-conductor 233 is provided with a flange 239 that is integral with the outer plug-conductor. This flange has connection holes by which it is attached via a permanent or semi-permanent attachment to the metal body of an electric vehicle. By a semi-permanent attachment, it should be understood that the attachment is only intended to be undone with significant effort, upon present or imminent failure of some aspect of the plug. When the plug is received in the socket and the outer plug- and socket conductors connect, the frame 539 is then electrically connected to the base-station-ground 433 via the flange (in addition to the third EV-conductor).

Plug & Socket Relationship

Because the inner and intermediate conductors are carrying the power for charging the EV, these are the ones that have the potential to pose a risk if the system is damaged or not operating properly. As a protective measure, the sum of the outer plug conductor-distance P33 plus the outer socket conductor-distance S33 is larger than the sum of the inner plug conductor-distance P31 plus the inner socket conductor-distance S31. Thus, when connecting the plug to the socket, the outer plug- and socket-conductors will electrically connect prior to the inner plug- and socket-conductors. Likewise, when disconnecting the plug from the socket, the inner plug- and socket-conductors will electrically disconnect prior to the outer plug- and socket-conductors.

Advantageously, this greater combined length of the outer conductors provides for a grounded shield completely surrounding the inner and intermediate conductors throughout the connection and disconnection process, as well as during charging. Mathematically, this relationship can be represented as:

$$P33+S33>P31+S31$$

Furthermore, the sum of the inner plug conductor-distance P31 plus the inner socket conductor-distance S31 is larger than the sum of the intermediate plug conductor-distance P32 plus the intermediate socket conductor-distance S32. Thus, when connecting the plug and the socket, the inner plug- and socket-conductors will electrically connect prior to the intermediate plug- and socket-conductors. Likewise, when disconnecting the plug from the socket, the intermediate plug- and socket-conductors will electrically disconnect prior to the inner plug- and socket-conductors.

Advantageously, the combined length of the inner conductors being greater than the combined length of the intermediate conductors provides for the connection of the inner conductors without arcing, as no arcing will occur without the intermediate conductors being connecting to complete the circuit. Mathematically, this relationship can be represented as:

$$P31+S31>P32+S32$$

The intermediate plug insulator-distance P42 is greater than the intermediate plug conductor-distance P32, and the intermediate socket insulator-distance S42 is greater than the intermediate socket conductor-distance S32. Additionally, both the intermediate plug-insulator and the intermediate socket-insulator have end-caps sized to both cover the distal ends of their respective conductors and conformingly pass one another during socket insertion (i.e., they are sized with matching plug-outer and socket-inner diameters, within a reasonable tolerance).

Advantageously, during connection and disconnection of the plug and the socket, and despite the first conductors already being electrically connected, the conforming end-caps block direct exposure, and thus reduce the likelihood that electrical arcing will occur prior to physical contact between the arriving intermediate plug- and socket-conductors, and after physical contact is broken between the departing intermediate plug- and socket-conductors. Mathematically, this relationship can be represented as:

$$P42>P32 \ \& \ S42>S32$$

Additionally, the sum of the intermediate plug insulator-distance P42 plus the inner socket insulator-distance S41 is larger than the sum of the inner plug conductor-distance P31 plus the inner socket conductor-distance S31. The sum of the intermediate plug insulator-distance P42 plus the inner socket insulator-distance S41 is also larger than the sum of the intermediate plug conductor-distance P32 plus the intermediate socket conductor-distance S32.

Thus, when connecting the plug and the socket, the intermediate plug-insulator and inner socket-insulator will be coextensive and electrically isolate the inner plug- and socket-conductors from the intermediate plug- and socket-conductors prior to either the inner plug- and socket-conductors making contact or the intermediate plug- and socket-conductors making contact. Likewise, when disconnecting the plug and the socket, the intermediate plug-insulator and inner socket-insulator will be coextensive and electrically isolate the inner plug- and socket-conductors from the intermediate plug- and socket-conductors until after both the inner plug- and socket-conductors break contact and the intermediate plug- and socket-conductors break contact. Mathematically, this relationship can be represented as:

$$P42+S41>P31+S31 \ \& \ P42+S41>P32+S32$$

Control System

With reference to FIGS. 1-3 & 5-6, the charging station includes a control system configured to control the operation of the charging station. More particularly, the control system includes a control-system controller 461 in the base station 401, a sensory mechanism having components in the socket 101, and/or the plug 201, and or a battery control system 561 within the electric vehicle.

A first aspect of the control system is a positive insertion detection system. In particular, the plug 201 and/or socket 101 are configured with one or more sensors 463 that are part of the a sensory mechanism, and that detect at least an adequate insertion of the socket over the plug to provide both positive connections between each plug-conductor and its respective socket-conductor, and more generally to detect a complete insertion of the plug into the socket to provide a safe, reliable and effective connections between each plug-conductor and its respective socket-conductor. These sensors may be configured to sense the relative positions of the plug and socket, and/or the contact efficiency of the respective conductors. Using these sensors, the control system controller 461 can limit a charging operation to the times when the plug and socket are fully engaged, thus further protecting users from any risks of exposure to live electrically charged conductors.

A second aspect of the control system is a battery charge controller from which the sensory mechanism can receive battery charging parameters. Under this aspect, a battery control system 561 communicates to the controller 461 con communicate its charge requirements and parameters, thus providing for the charging station to provide optimal or preferable charging characteristics.

Under either of these two aspects, the sensory mechanism is configured to communicate its sensed information to the control system controller 461, such as via an isolated RF communication signal through one or more of the cable conductors.

A third aspect of the control system is a controller configured to be a charge-controller. In particular, the control-system controller 461 controls the application of power to the transmission cable and socket based upon sensory readings showing that the plug and socket are fully engaged, sensory readings or customer input indicating the charge requirements, and other transactional information (e.g., payment information if the power is being disseminated at a retail establishment).

Cooling System

With reference to FIGS. 1-4, the charging station is further equipped with a cooling system including a coolant supply 601, and a coolant supply passage 621 configured to supply coolant for cooling the base station 401, and/or transmission cable 301, and/or the socket 101, and/or the plug 201. More particularly, the cooling system is configured to pump a stream of coolant (e.g., air) down a cable coolant-passageway 321 through the transmission cable 301 to the socket 101. Within the transmission cable, the cable coolant-passageway adjoins the inner cable-conductor 331 within the inner cable-insulator 341. Optionally, the cable coolant-passageway may concentrically pass down the center of the inner cable-conductor.

The cable coolant-passageway 321 and socket 101 are configured such that the cable coolant-passageway is in fluid communication through a socket-orifice 151 with the socket, and more particularly, with the inner socket-aperture 121. Thus, with the cooling system in operation, the coolant is expelled from the cable coolant-passageway into the inner socket-aperture. When the plug 201 is plugged into the socket, the inner plug-aperture 221 is in fluid communication with (and significantly overlapping with) the inner socket-aperture 121. Thus, with the cooling system in operation, the coolant passes through the inner plug-aperture 221. At the proximal end of the inner plug-aperture 221 an orifice 251 provides an exit from the plug for the coolant. Thus, the coolant passes from the base station 401, through the transmission cable 301, the socket 101 and the plug 201, possibly cooling all four, and exiting from the plug.

Variations of this Embodiment

In one variation of this embodiment, the socket could be attached to the EV, while the plug could be attached to the transmission cable. In such an embodiment, all of the recited connections to the respective base station and EV, orifices and the like, would typically be reversed between the plug and the socket, including the cooling system connections, such that the system would be operationally equivalent.

In another variation of this embodiment, the coolant may be another gas, may be a liquid, or may be a coolant that goes through a state change as it absorbs heat while passing through the transmission cable 301, socket 101 and/or plug 201. Additionally, there could be a second passageway in the cable and/or socket and/or plug such that the coolant may be returned via the second passage through the cable 301 to the base unit 401 (e.g., if the coolant was a liquid). Other variations are also within the scope of the invention.

Methods

The method of this embodiment involves steps of insertion, which go through a series of positions, as illustrated in FIGS. 7-12 through which a user holding the socket handle moves the socket. Charging of the EV by the charging system is then conducted. Upon either the completion of charging or the incomplete termination of charging, the method of this embodiment further involves steps of removal, which go through the series of positions, as illustrated in FIGS. 7-12 (taken in the reverse order), through which the user moves the socket.

Figure 7:
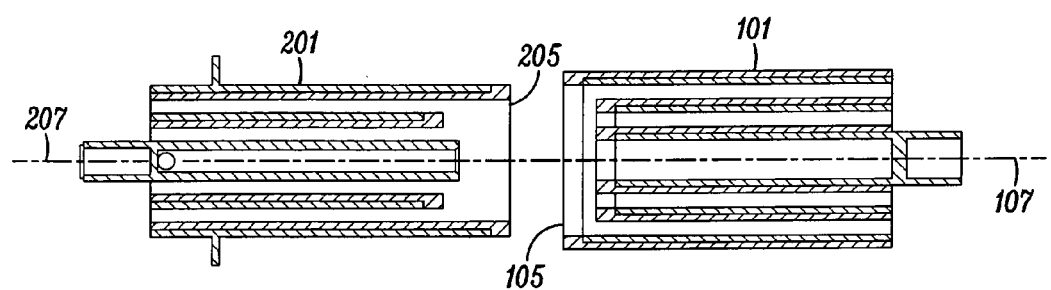
FIG. 7 is a front cross-sectional view of the plug and socket of FIG. 5 in a first, wholly separated relative position.

With reference to FIG. 7, under the method of this embodiment the plug 201 and socket 101 are placed in a facing relationship with their respective insertion axes 107 & 207 aligned, and with their open, distal ends 105, 205 facing one another. At this point in time (i.e., in this depicted location) the control-system controller 461 prevents the application of power to the inner and intermediate conductors of the transmission cable and socket (i.e., the socket is not hot), but it does connect the base-station-ground to the outer cable- and socket-conductors. The base-station-ground remains connected to the outer cable- and socket-conductors at all times during this process.

Figure 8:
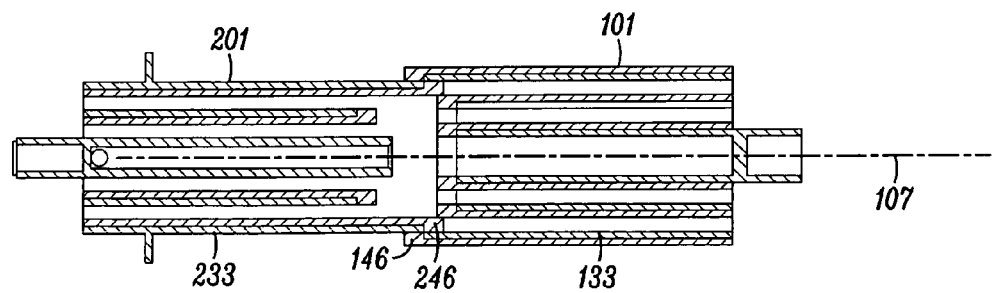
FIG. 8 is a front cross-sectional view of the plug and socket of FIG. 5 in a second relative position.

With reference to FIG. 8, the socket 101 is moved distally along its insertion axes 107 toward the plug 201. The outer socket-insulator end-cap 146 moves conformingly around and then passes the outer plug-insulator end-cap 246. The conforming relationship between these end-caps electrically isolates the outer socket-conductor 133 from the outer plug-conductor 233, and prevents electrical arcing between them, should the potential for such arcing exist prior to the outer conductors physically connecting. For the purposes of this patent, the phrase electrically isolate is being used to represent the interposing of a solid, electrical insulator between the relevant conductors to completely physically separate those conductors. Once the end-caps pass one another, the outer socket-conductor and outer plug-conductor both physically and electrically connect with one another, thereby forming a grounded shield (including both outer conductors) surrounding the full-length of the inner and intermediate conductors of the plug and socket.

Figure 9:
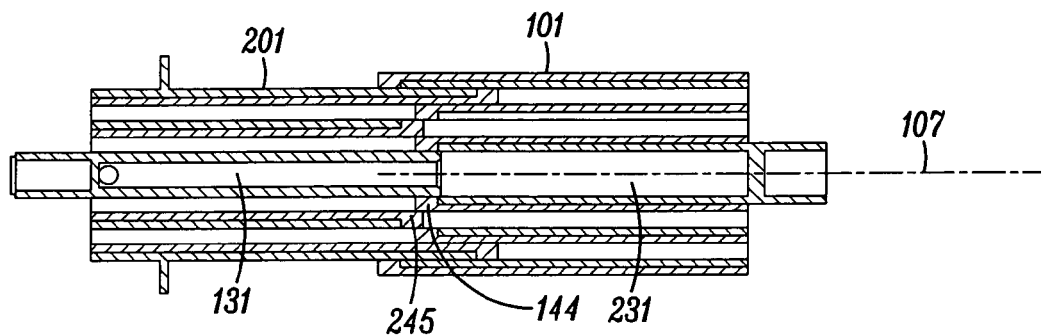
FIG. 9 is a front cross-sectional view of the plug and socket of FIG. 5 in a third relative position.

With reference to FIG. 9, the socket 101 is moved distally further along its insertion axes 107 toward the plug 201. The inner socket-insulator end-cap 144 begins to overlap conformingly within the intermediate plug-insulator end-cap 245. The conforming relationship between the respective insulators of these end-caps effectively uses the insulators to electrically isolate the inner conductors from the intermediate conductors. This electrical isolation prevents electrical arcing between one of the inner conductors and one of the intermediate conductors, should the potential for such arcing exist prior to the inner or intermediate conductors physically connecting. Once the end-caps establish relative positions that insulate the inner conductors from the intermediate conductors, the inner socket-conductor 131 and inner plug-conductor 231 both physically and electrically connect with one another, thereby forming a first electrical connection between the base station and the EV, which will be given a positive charge once power is applied.

Figure 10:
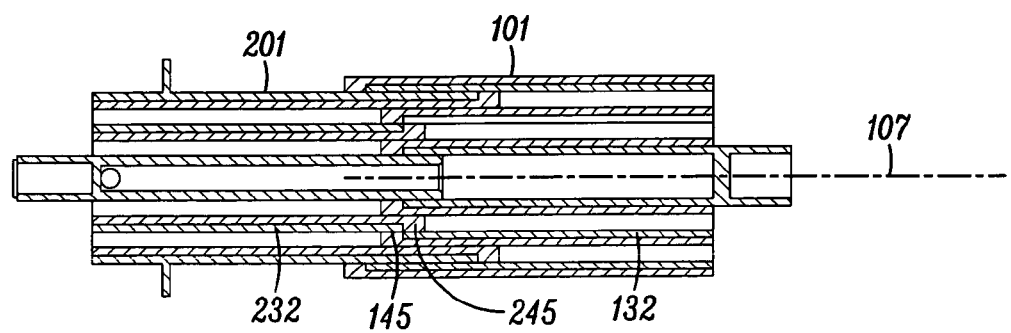
FIG. 10 is a front cross-sectional view of the plug and socket of FIG. 5 in a fourth relative position.

With reference to FIG. 10, the socket 101 is moved distally further along its insertion axes 107 toward the plug 201. The intermediate socket-insulator end-cap 145 moves conformingly around and then passes the intermediate plug-insulator end-cap 245. The conforming relationship between these end-caps effectively uses the insulators to electrically isolate the inner conductors from the intermediate conductors. This electrical isolation prevents electrical arcing between the intermediate socket-conductor 132 and intermediate plug-conductor 232, should the potential for such arcing exist prior to the intermediate conductors physically connecting. Once the end-caps pass one another, the intermediate socket-conductor and intermediate plug-conductor both physically and electrically connect with one another, thereby forming a second electrical connection between the base station and the EV, which will be given a negative charge once power is applied.

Figure 11:
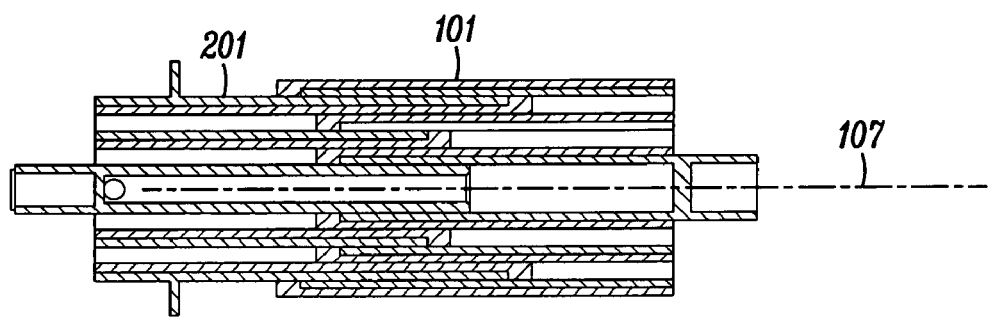
FIG. 11 is a front cross-sectional view of the plug and socket of FIG. 5 in a fifth relative position.

With reference to FIG. 11, the socket 101 is moved distally further along its insertion axes 107 toward the plug 201. At this depicted location, each socket-conductor electrically and physically connects with its respective plug-conductor, but no power is applied (i.e., the socket is still not hot).

Figure 12:
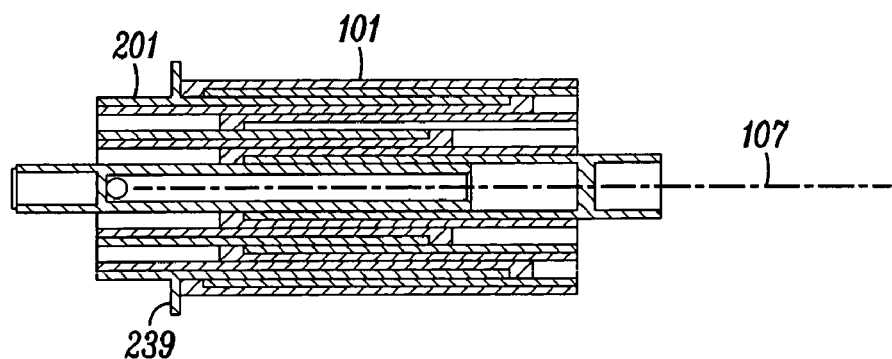
FIG. 12 is a front cross-sectional view of the plug and socket of FIG. 5 in a sixth, fully engaged relative position.

With reference to FIGS. 3 & 12, the socket 101 is moved distally further along its insertion axes 107 toward the plug 201 until the plug flange 239 physically prohibits the socket from proceeding further. In reaching this position, the socket actuates the sensors 463 that detected an adequate insertion of the socket over the plug, and those sensors in turn signal the control-system controller 461 that the socket is fully engaged on the plug, and is prepared for charging. If it has not occurred previously, the user enters any necessary information (e.g., charge parameters and or payment information) and actuates a start switch (e.g., the trigger 193 on the handle 191 that is affixed to the socket 101). In response, the controller 461 pumps a stream of coolant (e.g., air) down the cable coolant-passageway 321 through the transmission cable 301 to the socket, and also applies a positive charge to the inner conductors and a negative charge to the intermediate conductors of the transmission cable and socket (i.e., it makes the socket hot), and charging begins.

The system is left in this physical/electrical configuration until charging is complete. Should the socket be partially withdrawn from the plug prior to the completion of charging, the sensors 463 signal the control-system controller 461 that the socket disengaged from the plug. The control-system controller 461 then cuts off the application of power to the transmission cable and socket (i.e., the socket is no longer hot). If this happens, charging may be restarted by re-engaging socket on the plug, and again pressing the start switch. Alternatively, the charging can be ended prematurely, and the process continued in the steps to remove the socket from the plug.

With reference to FIG. 11, once the charging is complete (or if charging has been ended prematurely) the socket 101 is moved proximally along its insertion axes 107 away from the plug 201. At this time (i.e., at this depicted location), each socket-conductor is electrically and physically connected with its respective plug-conductor, but again no power is applied (i.e., the socket is again not hot).

With reference to FIG. 10, the socket 101 is moved proximally further along its insertion axes 107 away from the plug 201. The intermediate socket-conductor and intermediate plug-conductor both physically and electrically disconnect from one another, thereby breaking the second electrical connection between the base station and the EV. The intermediate socket-insulator end-cap 145 moves conformingly around the intermediate plug-insulator end-cap 245. The conforming relationship between these end-caps electrically isolates and prevents electrical arcing between the intermediate socket-conductor 132 and intermediate plug-conductor 232, should the potential for such arcing still exist after the intermediate conductors physically disconnect.

With reference to FIG. 9, the socket 101 is moved proximally further along its insertion axes 107 away from the plug 201. The inner socket-conductor 131 and inner plug-conductor 231 both physically and electrically disconnect from one another, thereby breaking the first electrical connection between the base station and the EV. The inner socket-insulator end-cap 144 continues to conformingly overlap with the intermediate plug-insulator end-cap 245, electrically isolating and preventing electrical arcing between either one of the socket-conductors and either one of the plug-conductors, should the potential for such arcing still exist after the inner conductors physically disconnect.

With reference to FIG. 8, the socket 101 is moved proximally further along its insertion axes 107 away from the plug 201. Once the inner and intermediate plug- and socket-conductors are well separated, the outer socket-conductor and outer plug-conductor both physically and electrically disconnect from one another, thereby breaking the grounded shield surrounding the full-length of the inner and intermediate plug- and socket-conductors. The outer socket-insulator end-cap 146 moves conformingly around and then passes off of the outer plug-insulator end-cap 246. The conforming relationship between these end-caps electrically isolates and prevents electrical arcing between the outer socket-conductor 133 and outer plug-conductor 233, should the potential for such arcing still exist after the outer conductors physically disconnect.

It is to be understood that the invention comprises apparatus and methods for designing and for producing charging systems and connection systems, as well as the apparatus and methods of using the charging systems and connection systems itself. Additionally, the various embodiments of the invention can incorporate various combinations of the above-described features. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. An electrical connection system, comprising:
a socket extending longitudinally from a proximal socket end to a distal socket end, and including an inner socket-protrusion defining a longitudinally extending inner socket-aperture, an intermediate socket-protrusion concentrically extending around the inner socket-protrusion to form an intermediate socket-aperture therebetween, and an outer socket-protrusion concentrically extending around the intermediate socket-protrusion to form an outer socket-aperture therebetween, wherein each socket-aperture has an open distal end and an inward-facing electrical conductor that extends to a respective conductor-distance from the proximal end of the socket; and a plug extending longitudinally from a proximal plug end to a distal plug end, and including an inner plug-protrusion, an intermediate plug-protrusion concentrically extending around the inner plug-protrusion, and an outer plug-protrusion concentrically extending around the intermediate plug-protrusion, each plug-protrusion being configured with an outward-facing electrical conductor that extends a respective conductor-distance from the proximal end of the plug and is configured to be conformingly received within the respective socket-aperture by the inward-facing conductor of the respective socket-protrusion;

wherein the sum of the conductor-distances of the outer plug-protrusion and the outer socket-protrusion is larger than the sum of the conductor-distances of the inner plug-protrusion and the inner socket-protrusion;

wherein the sum of the conductor-distances of the inner plug-protrusion and the inner socket-protrusion is larger than the sum of the conductor-distances of the intermediate plug-protrusion and the intermediate socket-protrusion;

wherein each socket-protrusion has an outward-facing electrical insulator that extends to an insulator-distance from the proximal end of the socket that is larger than the respective conductor-distance of that socket-protrusion;

wherein the intermediate and outer plug-protrusions each have an inward-facing electrical insulator that extends to an insulator-distance from the proximal end of the plug that is larger than the respective conductor-distance of that plug-protrusion; and wherein each insulator extends radially to form an end-cap that covers the distal end of its respective socket-conductor.

2. The electrical connection system of claim 1, wherein:
the inner socket-protrusion has an outward-facing electrical insulator that extends to an insulator-distance from the proximal end of the socket;
the intermediate plug-protrusion has an inward-facing electrical insulator that extends to an insulator-distance from the proximal end of the plug; and
the sum of the insulator-distances of the inner socket-protrusion and the intermediate plug protrusion is larger than the sum of the conductor-distances of the inner plug-protrusion and the inner socket-protrusion.

3. The electrical connection system of claim 1, wherein the socket and plug are each configured with proximal orifices forming a passageway through their respective inner apertures for passing a coolant.

4. An electrical connection system, comprising:
a socket extending longitudinally from a proximal socket end to a distal socket end, and including an inner socket-protrusion defining a longitudinally extending inner socket-aperture, an intermediate socket-protrusion concentrically extending around the inner socket-protrusion to form an intermediate socket-aperture therebetween, and an outer socket-protrusion concentrically extending around the intermediate socket-protrusion to form an outer socket-aperture therebetween, wherein each socket-aperture has an open distal end and an inward-facing electrical conductor that extends to a respective conductor-distance from the proximal end of the socket; and a plug extending longitudinally from a proximal plug end to a distal plug end, and including an inner plug-protrusion, an intermediate plug-protrusion concentrically extending around the inner plug-protrusion, and an outer plug-protrusion concentrically extending around the intermediate plug-protrusion, each plug-protrusion being configured with an outward-facing electrical conductor that extends a respective conductor-distance from the proximal end of the plug and is configured to be conformingly received within the respective socket-aperture by the inward-facing conductor of the respective socket-protrusion;

wherein the sum of the conductor-distances of the outer plug-protrusion and the outer socket-protrusion is larger than the sum of the conductor-distances of the inner plug-protrusion and the inner socket-protrusion;

wherein the sum of the conductor-distances of the inner plug-protrusion and the inner socket-protrusion is larger than the sum of the conductor-distances of the intermediate plug-protrusion and the intermediate socket-protrusion;

wherein each socket-protrusion has an outward-facing electrical insulator that extends to an insulator-distance from the proximal end of the socket that is larger than the respective conductor-distance of that socket-protrusion;

wherein the intermediate and outer plug-protrusions each have an inward-facing electrical insulator that extends to an insulator-distance from the proximal end of the plug that is larger than the respective conductor-distance of that plug-protrusion;

wherein each insulator extends radially to form an end-cap that covers the distal end of its respective socket-conductor;

wherein the sum of the insulator-distances of the inner socket-protrusion and the intermediate plug protrusion is larger than the sum of the conductor-distances of the inner plug-protrusion and the inner socket-protrusion;

wherein the station electrical connector includes a sensor to sense full engagement of the station electrical connector with the device electrical connector; and wherein the socket and plug are each configured with proximal orifices forming a passageway through their respective inner apertures for passing a coolant.

* * * * *